(12) United States Patent
Wright

(10) Patent No.: US 10,184,714 B1
(45) Date of Patent: Jan. 22, 2019

(54) DEICING SYSTEM FOR AIR COMPRESSOR AFTERCOOLER

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 16 days.

(21) Appl. No.: 15/677,403

(22) Filed: Aug. 15, 2017

(51) Int. Cl.
*B61C 17/00* (2006.01)
*F25D 21/00* (2006.01)
*F25D 21/12* (2006.01)

(52) U.S. Cl.
CPC ............ *F25D 21/006* (2013.01); *B61C 17/00* (2013.01); *F25D 21/12* (2013.01)

(58) Field of Classification Search
CPC ........ F25D 21/006; F25D 21/12; B61C 17/00
See application file for complete search history.

(56) References Cited

U.S. PATENT DOCUMENTS

2006/0067833 A1   3/2006   McAuliffe et al.

FOREIGN PATENT DOCUMENTS

EP  2990646       3/2016
EP  2990646 A1 *  3/2016  ............. B60T 17/02
WO  2016/114787   7/2016

OTHER PUBLICATIONS

International Search Report Form PCT/ISA/220, International Application No. PCT/US2017/046915, pp. 1-12, dated Apr. 24, 2018.

* cited by examiner

*Primary Examiner* — Ana M Vazquez
(74) *Attorney, Agent, or Firm* — Bond Schoeneck & King, PLLC; David Nocilly; George R. McGuire

(57) ABSTRACT

A compressor deicing system having an intercooler deicer valve and an after cooler deicer valve for selectively open and closing the first stage unloader and the second stage unloader so that high temperature air will deice the intercooler and aftercooler. When the first stage unloader is closed and the second stage unloader is open, the first stage temperatures will increase and the resulting high-temperature first stage air will thaw any ice accumulated in the intercooler. When the first stage unloader is open and the second stage unloader is closed, the second stage temperatures will increase and the resulting high-temperature second stage air will thaw any ice accumulated in the aftercooler.

15 Claims, 9 Drawing Sheets

DEICING SYSTEM FOR AIR COMPRESSOR AFTERCOOLER

BACKGROUND OF THE INVENTION

1. Field of the Invention

The present invention relates to locomotive air supply systems, and more particularly, to the deicing of air compressor intercoolers and aftercoolers.

2. Description of the Related Art

A typical railway two-stage air compressor includes both an intercooler and an aftercooler to remove the heat of compression. The water holding capacity of air is highly dependent on temperature, known as the saturation partial pressure; at high temperatures, air can hold much more water vapor than at low temperatures. Further the saturation partial pressure is independent of the air pressure, so as air is isothermally compressed all water vapor pressure exceeding the saturation partial pressure precipitates as liquid water. In a typical air compressor, the compression is not isothermal, and the air heats during compression and its water vapor holding capacity is correspondingly increased. Under most inlet conditions, liquid water will precipitate in both the intercooler and aftercooler as the air cools. When ambient temperatures are below freezing and the compressor is operating at a low duty cycle operation, the compressor may not generate enough heat in the intercooler and/or aftercooler to keep the coolers above freezing. As a result, frosting and icing may occur inside the coolers and they may become blocked with ice. If the icing conditions persist, the flow of compressed air through the cooler may be blocked, thereby preventing the delivery of compressed air to the locomotive main reservoirs and jeopardizing the braking capabilities of the train.

Conventional solutions to intercooler or aftercooler freezing involve the use of bypass circuits having a manually operated bypass valve and a bypass flow passage in parallel with the cooler circuit. While this bypass solution can work, the bypass valves must be manually opened in the winter season and closed at the end of the winter season. In addition to the practical difficulties with manually changing the bypass valves, such as having access to all bypass valves at the appropriate time, there are no guarantees that the seasonal changing over of the bypass valves will coincide with actual changes in ambient temperatures. For example, locomotives routinely travel through regions that remain cold enough to result in freezing throughout most of the year. As a result, there is a need in the art for an approach to deicing that more completely addresses the problem.

BRIEF SUMMARY OF THE INVENTION

The present invention provides a deicing system for an air compressor having a first stage unloader valve and a second stage unloader valve that can easily and automatically provide for deicing when ambient temperature change. The deicing system includes an intercooler deicer valve that is coupled to the first stage unloader valve and that is moveable between a first position, where the first stage unloader valve is connected to an outlet of an unloader control valve and a second position, where the first stage unloader valve is connected to exhaust. The deicing system also includes an aftercooler deicer valve that is coupled to the second stage unloader valve and that is moveable between a first position, where the second stage unloader valve is connected to the outlet of the unloader control valve and a second position, where the second stage unloader valve is connected to a third exhaust. A controller is interconnected to the pilots of the intercooler deicer valve and the aftercooler deicer valve and is programmed to pilot the intercooler deicer valve into the second position while the aftercooler deicer valve is in the first position for a first time interval when an ambient temperature is below a predetermined threshold. The controller is further programmed to pilot the aftercooler deicer valve into the second position while the intercooler deicer valve is in the first position for a second time interval when the ambient temperature is below a predetermined threshold. The controller may be programmed to determine whether the compressor is unloaded prior to piloting the intercooler deicer valve and the aftercooler deicer valve. The controller may also be programmed to repeat the piloting of the intercooler deicer valve and the aftercooler deicer valve after a predetermined wait interval that may be adjusted based on the ambient temperature. A pressure sensor may be associated with the outlet of the unloader control valve and interconnected to the controller. An ambient temperature sensor may also be interconnected to the controller. A first temperature sensor may be associated with an outlet of the intercooler and interconnected to the controller and a second temperature sensor may be associated with an outlet of the aftercooler and interconnected to the controller. The controller may then be programmed to adjust the predetermined wait time interval based on reading the first temperature sensor or the second temperature sensor. The controller may further be programmed to adjust the predetermined wait time interval based on a load cycle of the compressor.

The present invention also includes a method of deicing an air compressor having a first stage unloader valve and a second stage unloader valve. The method begins with the step of determining if the ambient temperature can result in icing of an intercooler or an aftercooler of the compressor. If so, the method includes coupling one of the first stage unloader valve or the second stage unloader valve to exhaust, while not coupling the other of the first stage unloader valve or the second stage unloader valve to exhaust, for a predetermined time interval so that the heat generated by that stage can deice the associated intercooler or aftercooler. The step of coupling of the first stage unloader valve or the second stage unloader valve to exhaust is accomplished by selectively piloting an intercooler deicer valve that is coupled to the first stage unloader valve and is moveable between a first position, where the first stage unloader valve is connected to the outlet of an unloader control valve and a second position, where the first stage unloader valve is connected to exhaust. The step of coupling of the first stage unloader valve or the second stage unloader valve to exhaust further comprises selectively piloting an aftercooler deicer valve that is coupled to the second stage unloader valve and is moveable between a first position, where the second stage unloader valve is connected to the outlet of the unloader control valve and a second position, where the second stage unloader valve is connected to exhaust. The method also includes step of coupling the other of the first stage unloader valve or the second stage unloader valve to exhaust for a second predetermined time interval while not coupling the first stage unloader valve or the second stage unloader valve that was previously coupled to exhaust for the first predetermined time interval. The method also comprises the step of repeating the steps of selectively coupling either of the first stage unloader valve or the second stage unloader valve after a predetermined wait interval that may be dependent on the ambient temperature.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
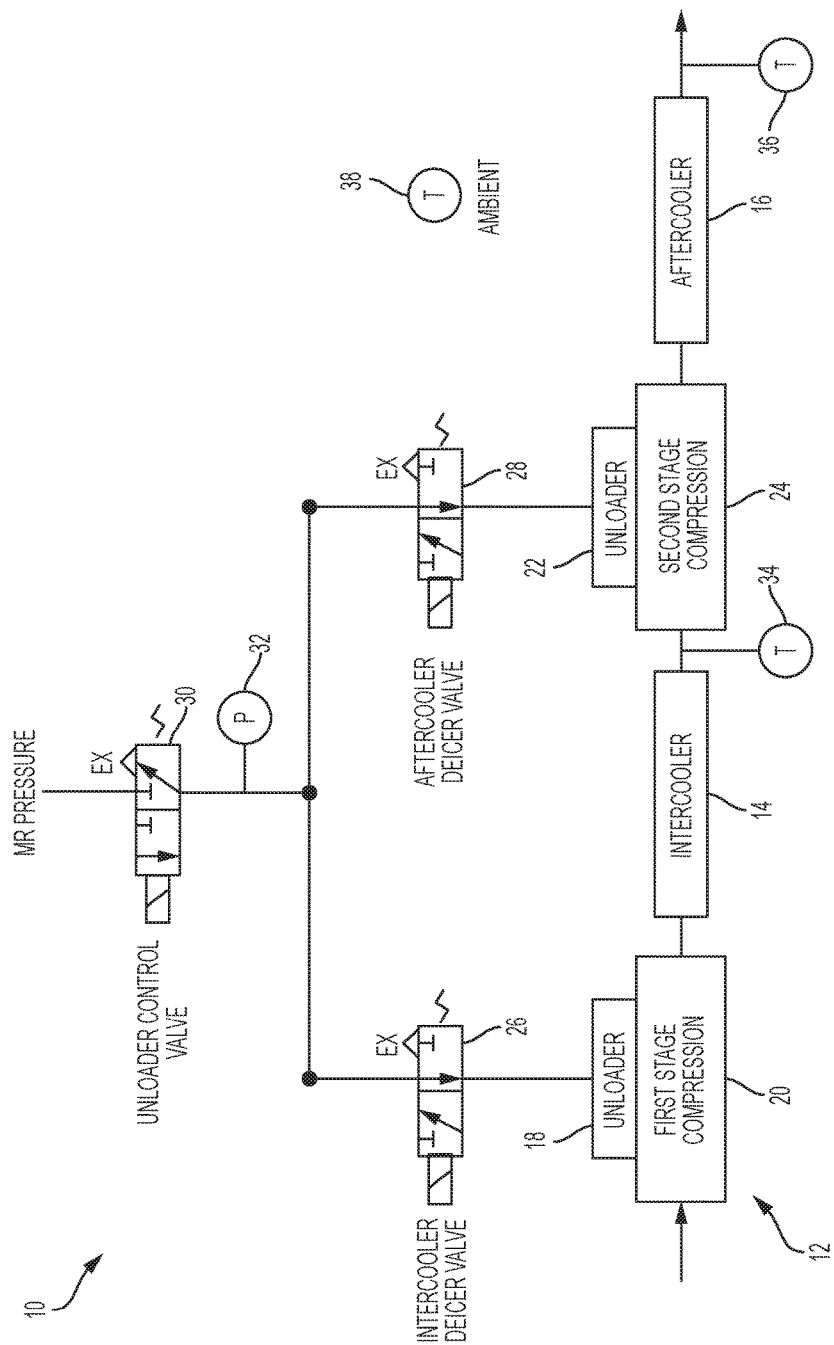
FIG. 1 is a schematic of a compressor deicing system according to the present invention.

Referring to the figures, wherein like numerals refer to like parts throughout, there is seen in FIG. 1 a system 10 associated with a two-stage locomotive air compressor 12 for selectively deicing the intercooler 14 and aftercooler 16 associated with compressor 12. Compressor 12 has a first unloader valve 18 associated with its first compression stage 20 and a second unloader valve 22 associated with its second compression stage 24. Unloader valves, such as first unloader valve 18 and second unloader valve 22, are used conventionally to reduce torque at compressor start-up by short-circuiting the inlet valves of compressor 12 so that there is no compression when the compressor begins to operate. Unloader valves 18 and 22 may be selectively piloted using compressed air to open and close when compressor 12 is running to control air delivery. For example, when unloader valves 18 and 22 are closed, compressor 12 is loaded and thus delivering air, and when the unloaders valves 18 and 22 are open, compressor 12 is unloaded and not delivering air. Thus, compressor 12 may be operated continuously with air delivery controlled via the unloader valves 18 and 22.

In addition to the conventional operation of unloader valve 18 and 22 for controlling air delivery, system 10 is configured to selectively operate first unloader valve 18 and a second unloader valve 22 for deicing of intercooler 14 and aftercooler 16. When first unloader valve 18 is closed and second unloader valve 22 is open, the temperature of first compression stage 20 will increase as pressures in the first stage increase. The high-temperature air in first compression stage 20 will thaw any ice accumulated in intercooler 14, while delivering only a small air flow capacity out of the compressor 12. When first unloader valve 18 is open and second unloader valve 22 is closed, the temperature of second compression stage 24 will increase as pressures in the second compression stage 24 increase. The high-temperature air in second compression stage 24 will thaw any ice accumulated in aftercooler 16, while delivering only a small air flow capacity out of the compressor 12.

As seen in FIG. 1, system 10 accomplishes selective control over first unloader valve 18 and second unloader valve 22 for with an intercooler deicer valve 26 associated with first unloader valve 18 and an aftercooler deicer valve 28 associated with second unloader valve 22. Intercooler deicer valve 26 and aftercooler deicer valve 28 are commonly coupled to an unloader control valve 30. Unloader control valve 30 may be piloted to selectively couple intercooler deicer valve 26 and aftercooler deicer valve 28 to a source of main reservoir pressure MR or to an exhaust EX. Intercooler deicer valve 26 may be correspondingly piloted to couple first unloader valve 18 to the output of unloader control valve 30 or to exhaust EX. Aftercooler deicer valve 28 may also be piloted to couple second unloader valve 18 to the output of unloader control valve 30 or to an exhaust EX. System 10 further includes a pressure transducer 32 positioned between the output of unloader control valve 30 and the inputs of intercooler deicer valve 26 and an aftercooler deicer valve 28. A first temperature sensor 34 is optionally positioned to determine the compressor air temperature between intercooler 14 and second compression stage 24. A second temperature sensor 36 is optionally positioned to determine the compressor air temperature downstream of aftercooler 16. A third temperature sensor 38 is positioned to determine ambient temperature. Intercooler deicer valve 26 and aftercooler deicer valve 28 may comprise three way magnetic valves for electronic control thereof as described herein.

Figure 2:
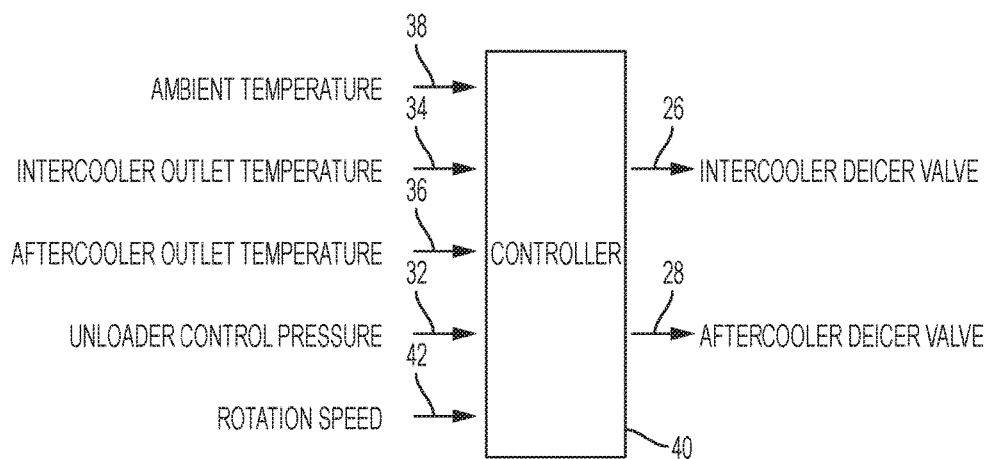
FIG. 2 is a schematic of a controller for a compressor deicing system according to the present invention.

Referring to FIG. 2, intercooler deicer valve 26 and aftercooler deicer valve 28 may be selectively operated by a controller 40 interconnected to first temperature sensor 34, second temperature sensor 36, and third temperature sensor 38. Controller 40 may also be coupled to unloader control valve pressure sensor 32 and a compressor rotation speed sensor 42. Controller 40 is programmed to provide individual control of intercooler deicer valve 26 and aftercooler deicer valve 28 via the corresponding magnetic valves. It should be recognized that other electrical, pneumatic, and electro-pneumatic approaches may be used to allow controller 40 to operate intercooler deicer valve 26 and aftercooler deicer valve 28. In an unpowered state, each three-way valve connects its associated compressor unloader to unloader control valve 30. In the powered state, the three-way valve vents its associated compressor unloader to exhaust EX and blocks unloader control valve 30. Controller 40 may be any programmable device having software, dedicated firmware, or digital or analog circuitry configured according to the present invention.

Figure 3:
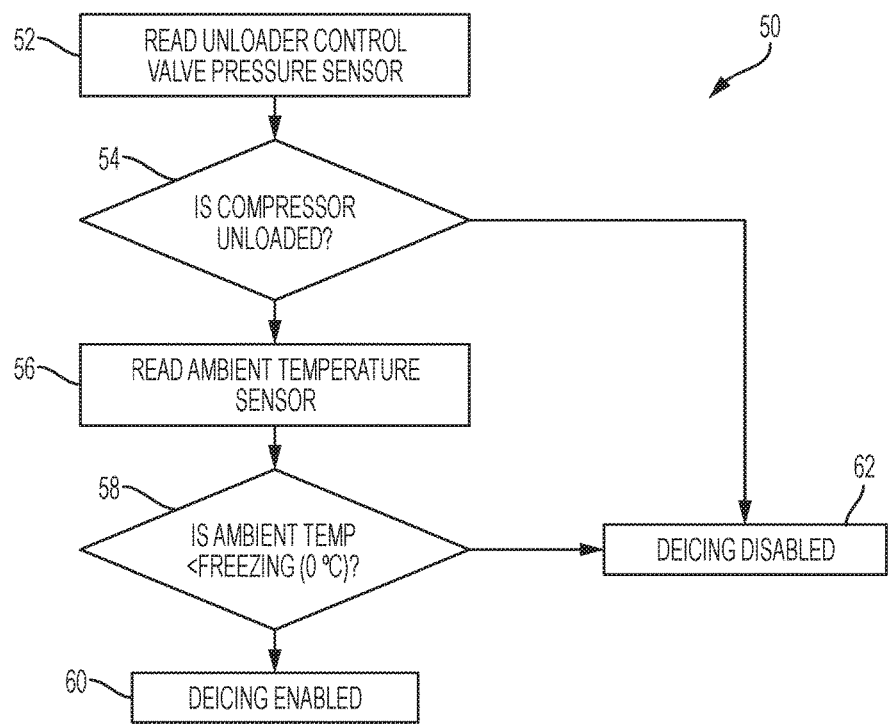
FIG. 3 is flow chart of a deicing enablement process for a compressor deicing system according to the present invention.

Referring to FIG. 3, controller 40 may implement a deicing enablement process 50 that begins with controller 40 reading the unloader control valve pressure sensor 32 to determine when the compressor is operating in the unloaded state 52. High pressure means that compressor 12 is unloaded, while low/zero pressure means loaded or compressor 12 is off. If a check 54 determines that compressor 12 is loaded, deicing is disabled 62. If check 54 determines that compressor 12 is unloaded, then controller 40 reads the ambient temperature sensor 56. If a check 58 determines the ambient temperature is greater than freezing (0° C.), then the intercooler/aftercooler deicing function is disabled 62. If the ambient temperature is less than or equal to freezing (0° C.) at check 58, then the intercooler/aftercooler deicing function is enabled 60.

Figure 4:
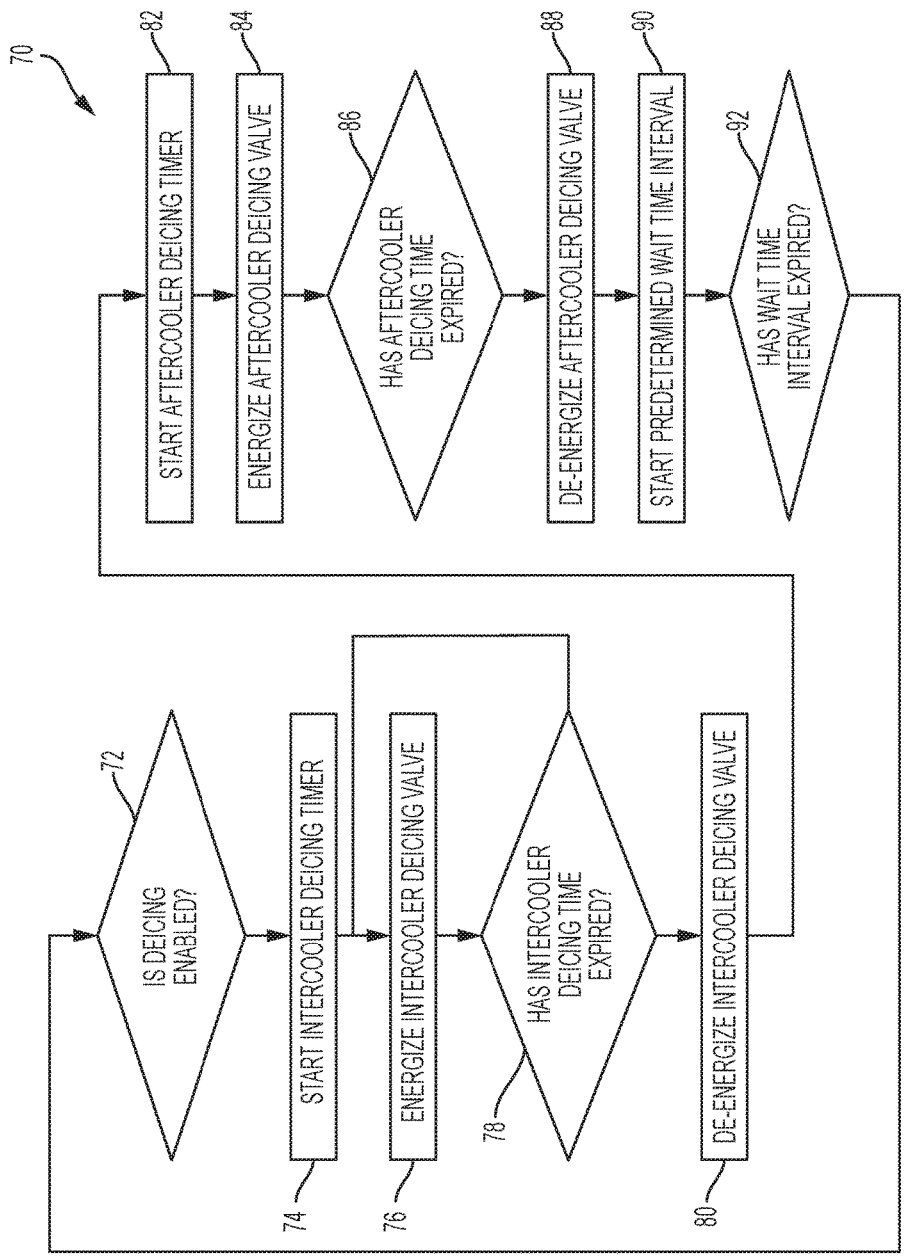
FIG. 4 is flow chart of a control process for a compressor deicing system according to the present invention.

Referring to FIG. 4, a first deicing system control process 70 may begin with a check 72 to determine if deicing is enabled, such as by process 50 of FIG. 3. If enabled, controller 40 starts an intercooler deicing timer 74 and energizes intercooler deicing valve to cause the first stage to load 76. This operation causes high temperature air to flow to intercooler 14. A check 78 whether the fixed intercooling deicing timer has expired provides for a fixed intercooling deicing time interval while the second stage remains unloaded. When check 78 determines that the end of the fixed intercooling deicing interval has been reached, controller 40 de-energizes intercooler deicing valve 80. Controller 40 next starts an aftercooler deicing timer 82 that establishes a fixed aftercooler deicing time interval and energizes the aftercooler deicing valve 84 to cause the second stage to load for a fixed time. This operation causes high temperature air to flow to aftercooler 16, thus melting any ice formed therein. When a check 86 determines that the aftercooler deicing timer has expired and thus the aftercooler deicing time interval has concluded, controller 40 de-energizes the aftercooler deicer valve 88. Controller 40 then starts a timer establishing a predefined wait time interval. When a check 90 determines that the wait timer has expired, deicing process 70 is restarted. The predefined wait interval may be proportional to the ambient temperature with a shorter interval at lower ambient temperatures as icing will occur more frequently when ambient temperatures are colder. If at any time controller 40 determines that compressor 12 is loaded by sensing that the unloader control pressure is approximately 0 psi (or less than some other low pressure used to define what is considered to be loaded), and the duration of the loaded cycle is less than a predefined minimum (for example 30 seconds), then controller 40 can complete any deicing sequence that is in progress. If the loaded cycle is greater than the predefined minimum, but less than some predefined maximum (for example, greater than 30 seconds but less than 60 seconds), controller 40 can optionally reset the wait timer. Note that the unloader control pressure is zero during loaded operation and when the compressor is OFF. The time limits may be selected to be long enough to have warmed both intercooler 14 and aftercooler 16, but with an upper limit to address the possibility of a compressor OFF state.

Figure 5:
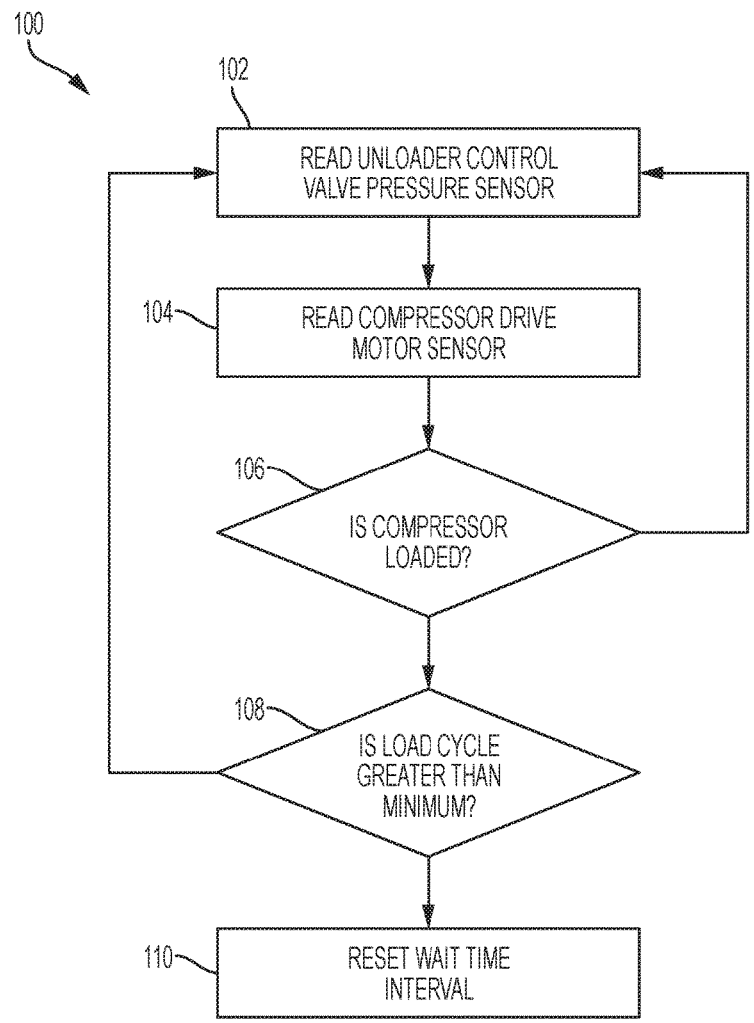
FIG. 5 is flow chart of a control process for a compressor deicing system that accounts for compressor load cycle according to the present invention.

Referring to FIG. 5, a second deicing system control process 100 may be used if controller 40 includes a current/frequency sensor on the drive motor of compressor 12 or a speed sensor on the rotating elements of compressor 12 to enable controller 40 to determine when compressor 12 is operating in the loaded state. In a loaded state, the unloader control pressure will be low and the speed signal will be high. Process 100 begins with controller 40 reading the control valve pressure sensor 102 and the compressor drive motor sensor 104. If a check 106 determines that compressor 12 is ON and loaded and second check 108 determines that the load cycle is greater than a predefined minimum (for example, greater than 30 seconds), controller 40 may optionally reset the wait time interval 110. The minimum operating time limit may be selected to be long enough to have warmed both intercooler 14 and aftercooler 16.

Figure 6:
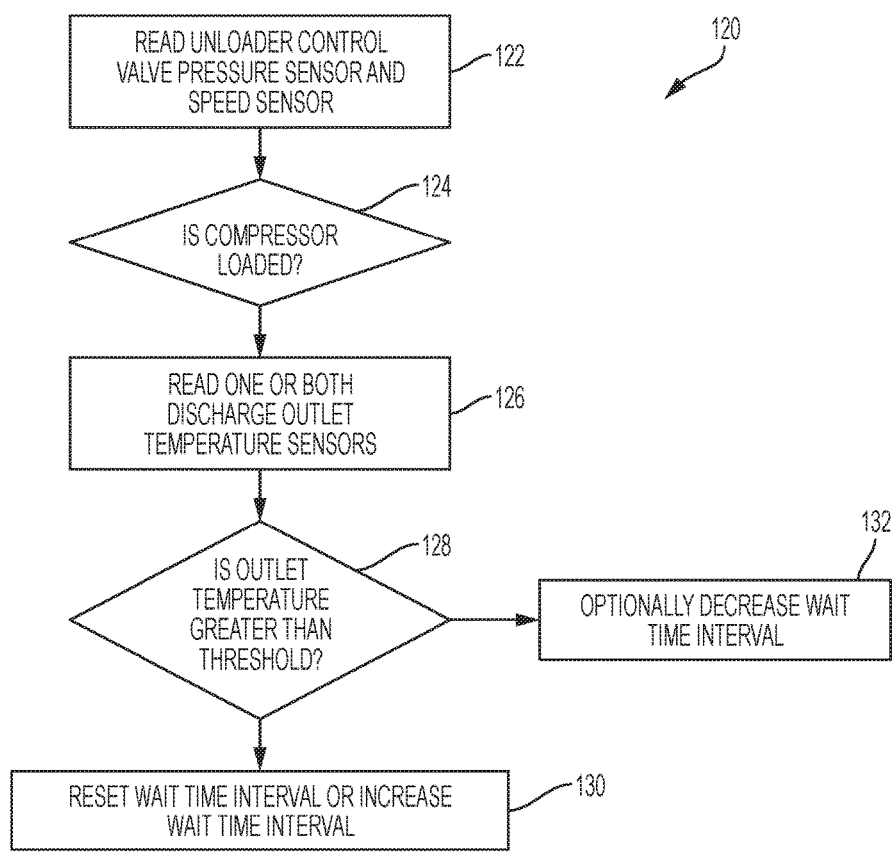
FIG. 6 is flow chart of a control process for a compressor deicing system that accounts for compressor outlet temperatures according to the present invention.

Referring to FIG. 6, a third deicing system control process 120 may be used if controller 40 is interconnected to first temperature sensor 34 in the outlet of intercooler 14 and/or the second temperature sensor in the outer of aftercooler 16. In operation, if the deicing mode is enabled as in FIG. 3, controller 40 begins process 120 by reading the unloader control pressure and the compressor drive motor speed sensor 42 to determine whether compressor 12 is operating in the loaded state. If a check 124 determines that compressor 12 is in the loaded operating state, controller 40 reads the one or both of the intercooler and aftercooler discharge temperatures 126. If a check 128 determines that the intercooler and/or aftercooler outlet temperatures are greater than a threshold, such as freezing plus a predefined margin (such as 5° C.), then the deicing function wait interval is reset 130 and may optionally be increased to a longer time. If the intercooler and aftercooler outlet temperatures are not greater than freezing plus the predefined margin (such as 5° C.) then the intercooler/aftercooler deicing wait interval is not reset and may optionally be decreased to a shorter time 132. In any of the embodiments, the intercooler deicing time duration and wait interval may optionally be different than the aftercooler deicing time duration and wait interval.

Figure 7:
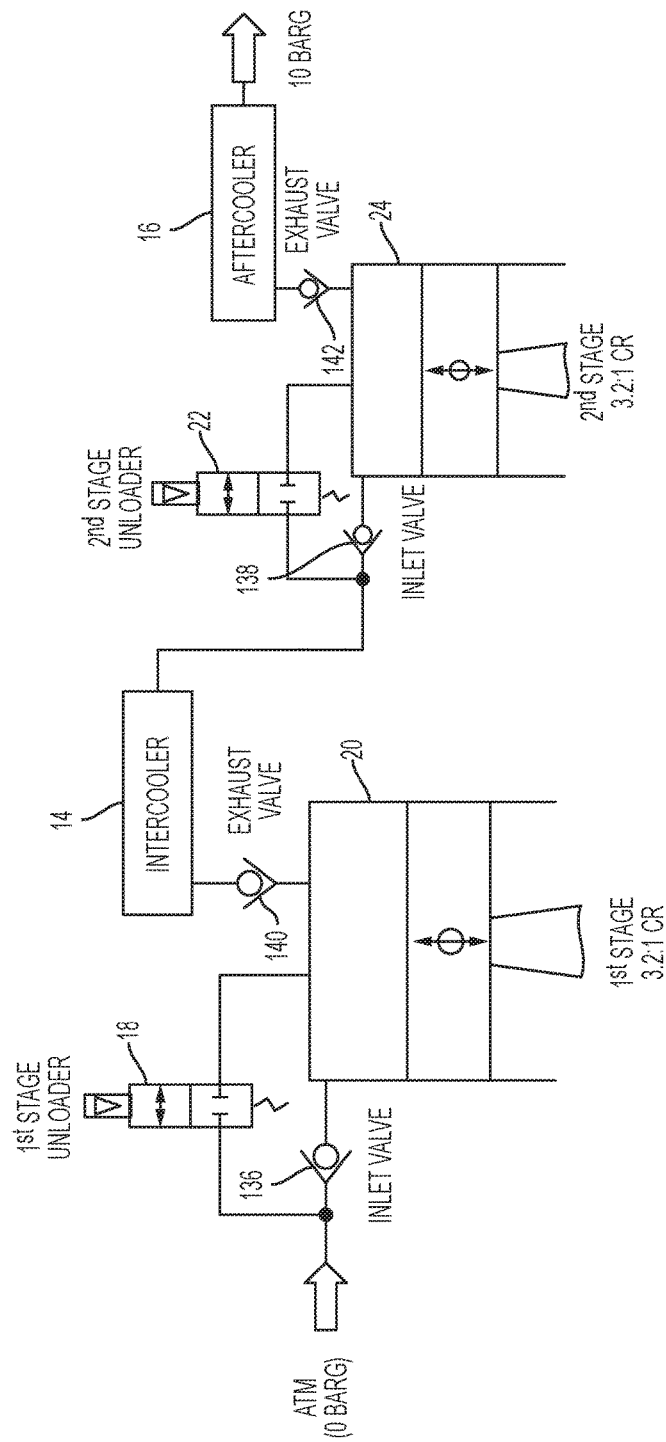
FIG. 7 is a schematic of a compressor deicing system according to the present invention in normal operation.
Figure 8:
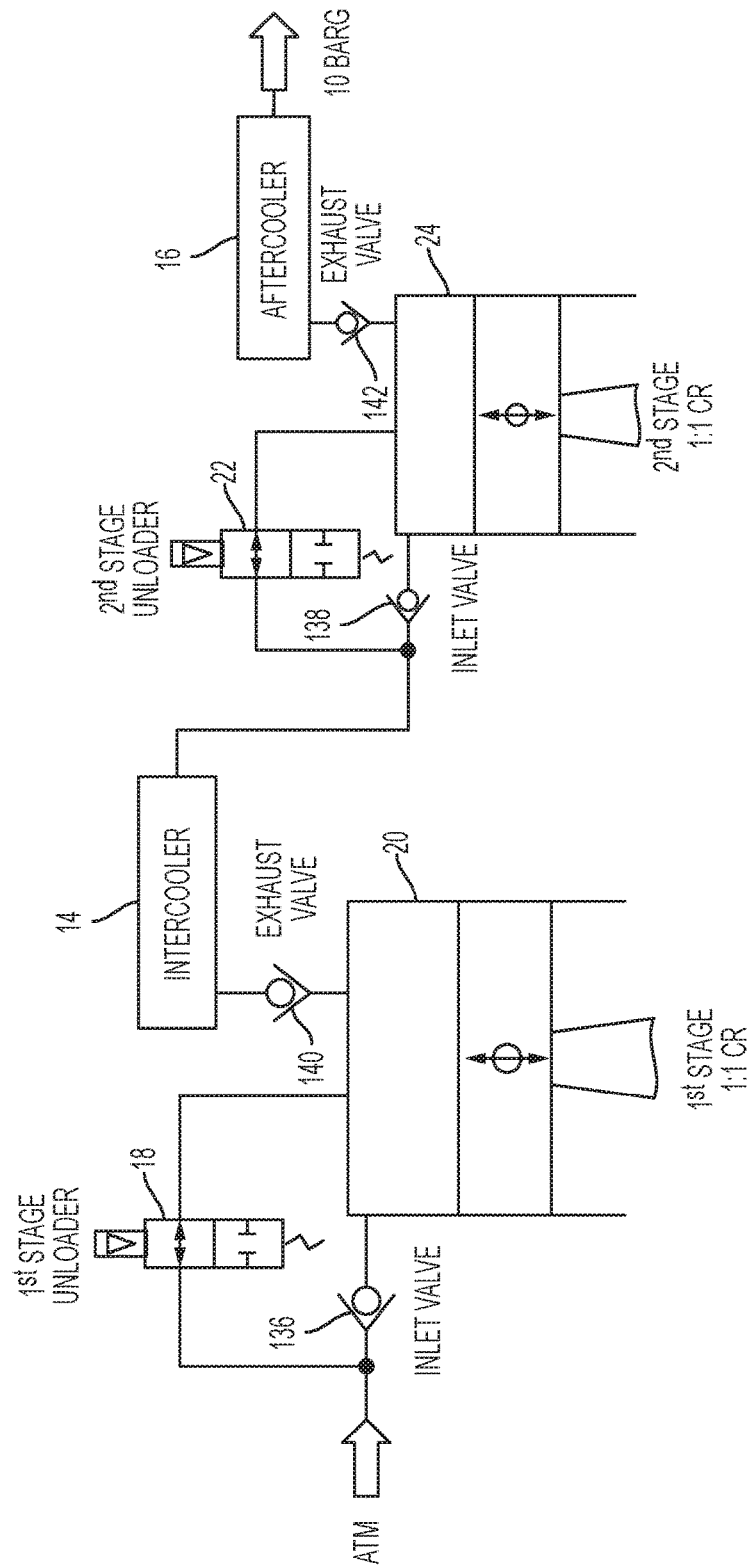
FIG. 8 is a schematic of a compressor deicing system according to the present invention in an unloaded configuration.

Referring to FIG. 7, first compression stage 20 and second compression stage 24 are typically sized so that each compresses at approximately a 3.2:1 compression ratio (CR), assuming the compressor governor is maintaining approximately 145 psi (10 bar) outlet pressure. This yields approximately a 10:1 compression ratio overall (3.2×3.2 is approximately 10) in normal operation with both unloader valves 18 and 22 closed. Referring to FIG. 8, in unloaded operation, the inlet valve 136 for first compression stage 20 and the inlet valve 138 for second compression stage 24 are short-circuited by unloader valves 18 and 22, respectively, so that no compression can occur. As a result, the compression ratio for each stage, and overall, is 1:1.

Figure 9:
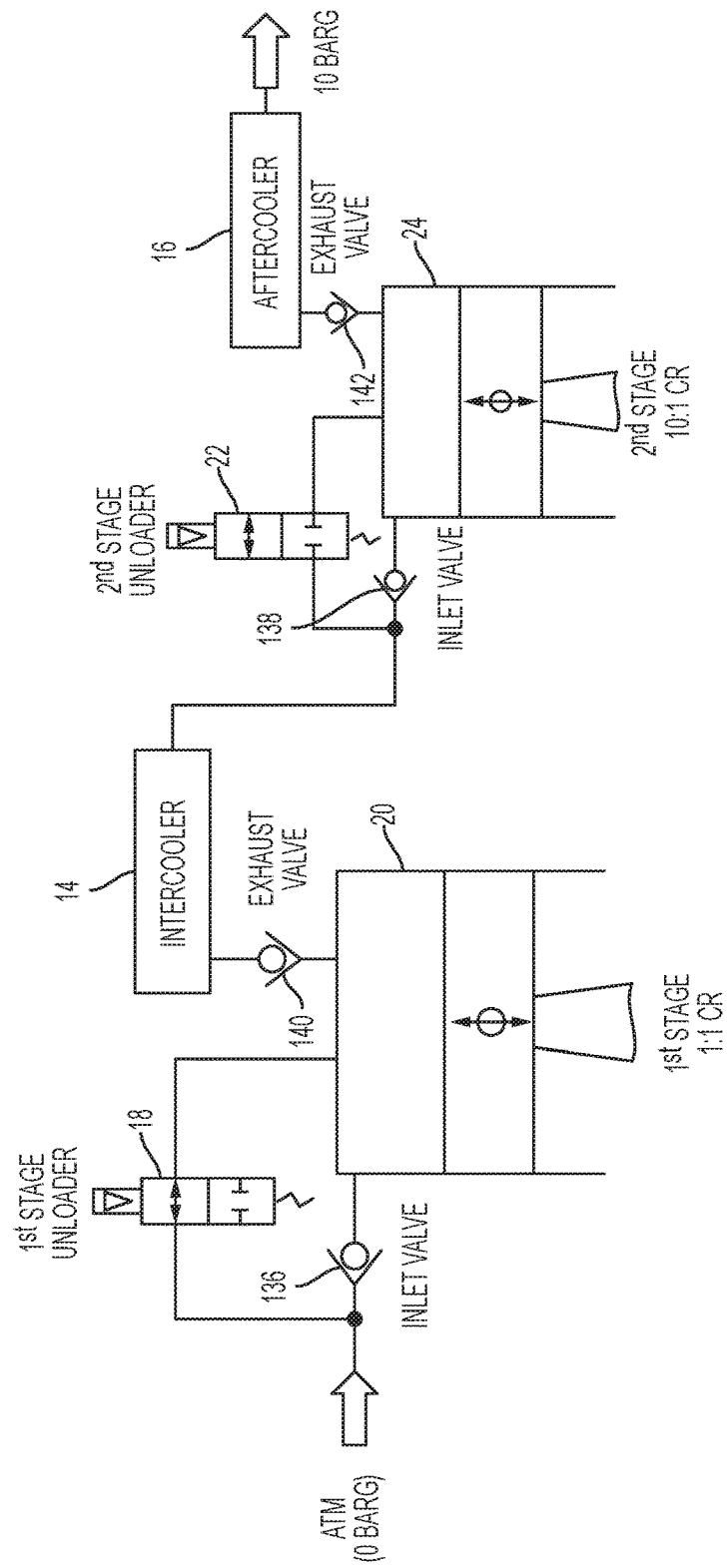
FIG. 9 is a schematic of a compressor deicing system according to the present invention in an aftercooler deicing configuration.

Referring to FIG. 9, when first stage unloader valve 18 is open and second stage unloader valve 22 is closed, then second compression stage 24 does all of the work and compresses at a compression ratio of 10:1. The intake is atmospheric pressure and the exhaust is 10 bar, albeit at a low volumetric flow. Because the compression ratio is 10:1, the heat of compression is much higher than in normal operation when the compression ratio is only 3.2:1. This higher heat of compression is used to de-ice aftercooler 16.

Figure 10:
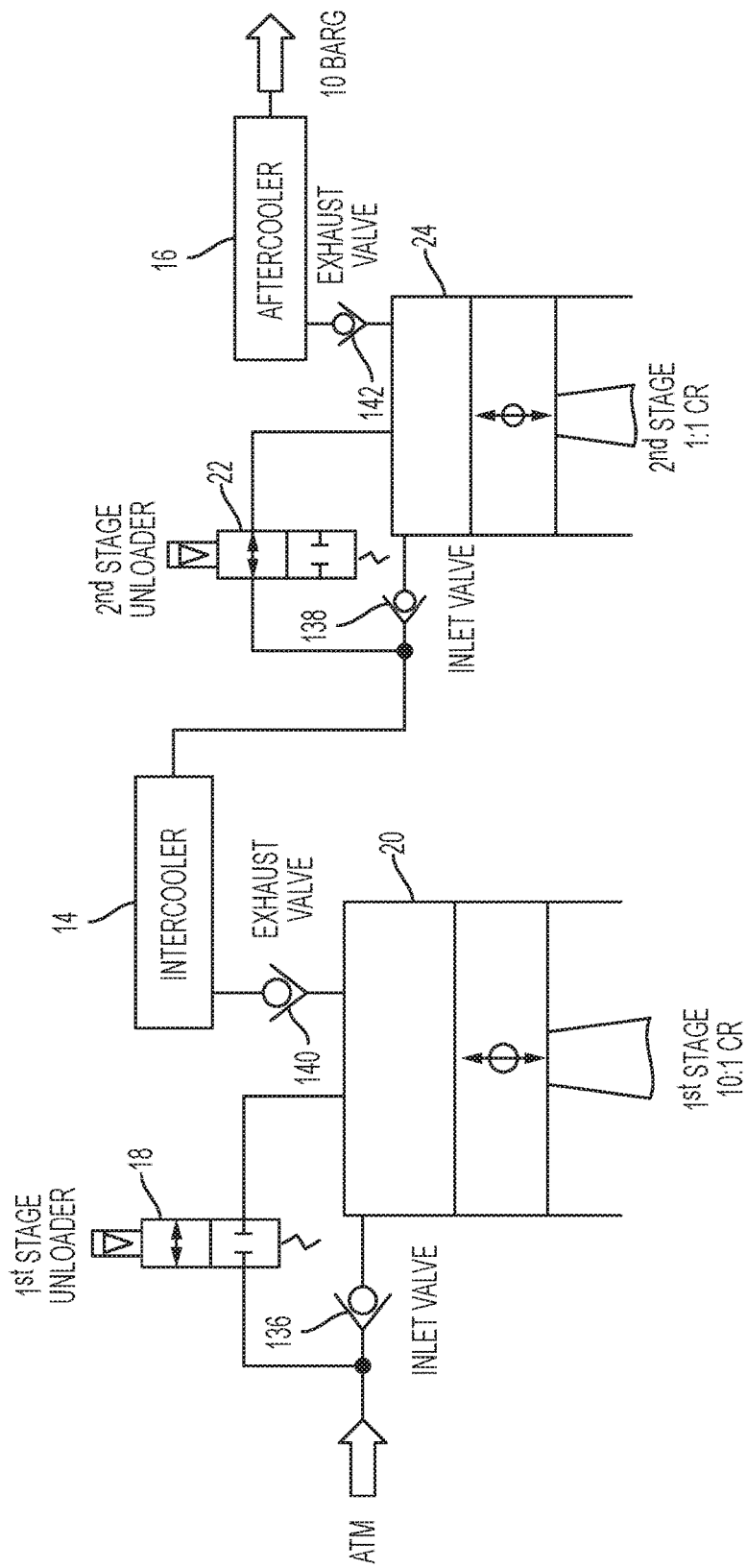
FIG. 10 is a schematic of a compressor deicing system according to the present invention in an intercooler deicing configuration.

Referring to FIG. 10, when first stage unloader 18 is closed and second stage unloader 22 is open, then first compression stage 20 does all the work and compresses at a compression ratio of 10:1. The intake suction resulting from a 3.2 compression ratio will result in 3.2 barg pressure in the cylinder at the bottom of the intake stroke. That pressure will increase to 10 bar at top dead center (3.2×3.2=~10). If the compressor outlet is less than 10 bar, then first compression stage 20 will flow air through the exhaust valve 142 of second compression stage 24 until the outlet reaches 10 bar. Because the compression ratio is 10:1, the heat of compression is much higher than in normal operation when the compression ratio is only 3.2:1. If the compressor outlet is at 10 bar or higher, then the pressure in first compression stage 20 is insufficient to flow through exhaust valve 142 of second compression stage 24. As a result, first compression stage 20 will add heat to the trapped volume of intermediate air on each compression stroke. This accumulated heat of compression is much higher than in normal operation when the compression ratio is only 3.2:1. This higher heat of compression is used to de-ice intercooler 14.

As described herein, the present invention is useful because compressor 12 is generally controlled by the locomotive on which it is placed to maintain the main reservoir system of the locomotive at a system pressure between 130 and 145 psi. In warm weather, unloaders 18 and 22 are primarily used to allow compressor 12 to start unloaded and come up to operating speed without the torque required to compress air. Once compressor 12 is at speed, unloader valves 18 and 22 are closed and compressor 12 operates normally. In cold weather, in addition to being used to help facilitate startup, unloader valves 18 and 22 may be used to control air delivery. More specifically, compressor 12 is continuously operated in colder weather because, at cold temperatures, oil-lubricated compressors may have very high starting torques even with the unloaders open due to the cold temperature viscosity of the crankcase oil. As compressor 12 is run continuously to avoid the cold start-up difficulties, unloader valves 18 and 22 are used to control whether the continuously operating compressor 12 is actually delivering compressed air. When compressor 12 is operating unloaded, however, there is no air flow, and little to no heat of compression but the crank-shaft driven cooling fan is operating to draw cold air across intercooler 14 and aftercooler 16. Any moisture which has precipitated out in intercooler 14 or aftercooler 16 is therefore subject to freezing. Generally both first stage unloader valve 18 and second stage unloader valve 22 are controlled synchronously by single locomotive controlled unloader control valve 30.

The present invention may thus provide an independent supplement to an existing locomotive compressor control system to provide intercooler/aftercooler deicing. Controller 40 may thus comprise a standalone device that is connected to a locomotive system along with the associated structural components for implementing the invention. Controller 40 may also comprise a legacy controller retrofitted with programming according to the present invention or even software or firmware implemented on the programmable elements of a locomotive control system that is responsible for controlling the conventional air supply equipment.

The present invention may thus be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A deicing system for an air compressor having a first stage unloader valve and a second stage unloader valve, comprising:

an intercooler deicer valve coupled to the first stage unloader valve that is moveable between a first position, where the first stage unloader valve is connected to an outlet of an unloader control valve and a second position, where the first stage unloader valve is connected to exhaust; and an aftercooler deicer valve coupled to the second stage unloader valve that is moveable between a first position, where the second stage unloader valve is connected to the outlet of the unloader control valve and a second position, where the second stage unloader valve is connected to a third exhaust.

2. The deicing system of claim 1, further comprising a controller interconnected to a first pilot for the intercooler deicer valve and a second pilot for the aftercooler deicer valve that is programmed to pilot the intercooler deicer valve and the aftercooler deicer valve.

3. The deicing system of claim 2, wherein the controller is programmed to pilot the intercooler deicer valve into the second position for a first time interval when an ambient temperature is below a predetermined threshold.

4. The deicing system of claim 3, wherein the controller is programmed to pilot the aftercooler deicer valve into the second position for a second time interval when the ambient temperature is below a predetermined threshold.

5. The deicing system of claim 4, wherein the controller is programmed to determine whether the compressor is unloaded prior to piloting either the intercooler deicer valve or the aftercooler deicer valve.

6. The deicing system of claim 5, wherein the controller is programmed to repeat the piloting of the intercooler deicer valve and the aftercooler deicer valve after a predetermined wait interval.

7. The deicing system of claim 6, a pressure sensor associated with the outlet of the unloader control valve and interconnected to the controller and an ambient pressure sensor interconnected to the controller.

8. The deicing system of claim 7, further comprising a first temperature sensor associated with an outlet of the intercooler and interconnected to the controller and a second temperature sensor associated with an outlet of the aftercooler and interconnected to the controller.

9. The deicing system of claim 8, wherein the controller is programmed to adjust a predetermined wait time interval based on reading the first temperature sensor or the second temperature sensor.

10. The deicing system of claim 9, wherein the controller is programmed to adjust the predetermined wait time interval based on a load cycle of the air compressor.

11. A method of deicing an air compressor having a first stage unloader valve and a second stage unloader valve, comprising the steps of:

determining if an ambient temperature can result in icing of an intercooler or an aftercooler of the compressor; and coupling one of the first stage unloader valve or the second stage unloader valve to exhaust while not coupling the other of the first stage unloader valve or the second stage unloader valve to exhaust for a predetermined time interval.

12. The method of claim 11, wherein the step of coupling of the first stage unloader valve or the second stage unloader valve to exhaust comprises selectively piloting an intercooler deicer valve that is coupled to the first stage unloader valve and is moveable between a first position, where the first stage unloader valve is connected to the outlet of an unloader control valve and a second position, where the first stage unloader valve is connected to exhaust.

13. The method of claim 12, where the step of coupling of the first stage unloader valve or the second stage unloader valve to exhaust further comprises selectively piloting an aftercooler deicer valve that is coupled to the second stage unloader valve and is moveable between a first position, where the second stage unloader valve is connected to the outlet of the unloader control valve and a second position, where the second stage unloader valve is connected to exhaust.

14. The method of claim 13, further comprising the step of coupling the other of the first stage unloader valve or the second stage unloader valve to exhaust for a second predetermined time interval while not coupling the first stage unloader valve or the second stage unloader valve that was previously coupled to exhaust for the first predetermined time interval.

15. The method of claim 14, further comprising the step of repeating the steps of selectively coupling either of the first stage unloader valve or the second stage unloader valve after a predetermined wait interval.

\* \* \* \* \*